July 7, 1964  D. B. DUNCAN ETAL  3,140,482
SYSTEM PROVIDING ERROR RATE DAMPING OF AN AUTONAVIGATOR
Filed June 7, 1954  3 Sheets-Sheet 1

INVENTORS.
DONAL B. DUNCAN
JEROME L. HENRY, JR.
BY STANFORD D. BLITZER

*William R. Lane*
ATTORNEY

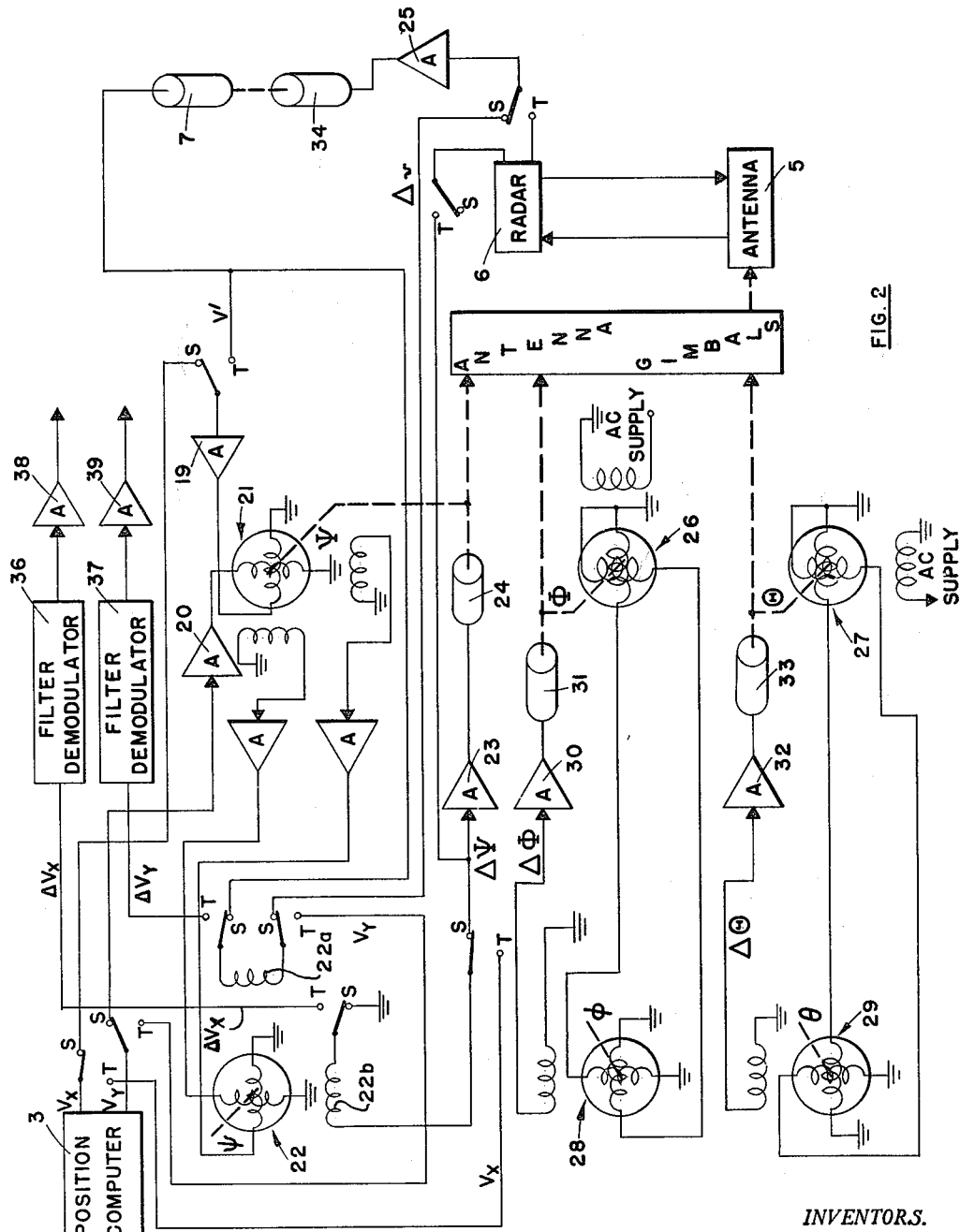

July 7, 1964  D. B. DUNCAN ETAL  3,140,482
SYSTEM PROVIDING ERROR RATE DAMPING OF AN AUTONAVIGATOR
Filed June 7, 1954  3 Sheets-Sheet 3

INVENTORS.
DONAL B. DUNCAN
JEROME L. HENRY, JR.
STANFORD D. BLITZER
BY
ATTORNEY

United States Patent Office 3,140,482
Patented July 7, 1964

3,140,482
SYSTEM PROVIDING ERROR RATE DAMPING
OF AN AUTONAVIGATOR
Donal B. Duncan, Arcadia, and Jerome L. Henry, Jr., Downey, Calif., and Stanford D. Blitzer, Brookline, Mass., assignors to North American Aviation, Inc.
Filed June 7, 1954, Ser. No. 434,778
18 Claims. (Cl. 343—6)

This invention is a system for combining velocity information from an inertial autonavigator source with velocity information from a non-inertial source to obtain information more accurate than that from either source.

In the functional analysis of inertial autonavigators (inertial autonavigators are those which determine distance traveled by utilization of devices which are sensitive to accelerations) it is found that various errors, such as in acceleration as well as in initial position and velocity are propagated and remain within the system in undamped sinusoidal form. The aircraft, or vehicular, position as computed by the autonavigator, therefore, oscillates with reference to the true position with a predictable period. These errors are not regenerative in the sense that a small error causes larger errors which become even larger.

It is possible to damp out the sinusoidal errors of the autonavigator by determining from other means the true velocity with respect to the earth's surface and inserting correcting information in the velocity or distance measuring section of the autonavigator.

This invention relates to determining velocity with respect to the earth and transforming this information suitably, to be compared with the velocity indicated by the autonavigator. It appears that any method for determining the velocity and direction with respect to ground might be used. In this instance, Doppler radar is utilized. The antenna of this radar is provided with three-axis mounting. In other embodiments, velocity with respect to ground, or earth, may be independently determined from, for example, non-inertial devices such as air speed indicators, r.p.m. indicators, photoelectric means for measuring velocity or optical means for measuring velocity. Other examples, in the case of ship navigation, are acoustic means for measuring velocity, sonar means for measuring velocity, or pit log velocity indication.

Inertial navigational aids, or autonavigators, assume a variety of forms. There are various ways of axially mounting the inertial instruments in order to obtain navigational information. In some instances the inertial instruments, such as accelerometers, velocity, or distance meters, are mounted in gimbals to be held in prescribed orientation. At times, a platform having complete freedom of motion about three axes is constructed. As a general rule, the distance measuring deviecs are provided with a reference platform or, at least a reference co-ordinate system by gyroscopic means. An integral part of the specific inertial autonavigator depicted for illustrative purposes in this specification is the stable platform. Upon the stable platform are located motion measuring devices known as accelerometers or distance meters. The stable platform holds these devices in a level plane and in a particular direction and navigation can thus be accomplished. Slaving of the radar antenna to the platform assures that the velocity is measured by the radar in the same level plane as the distance meters measure it. In addition, during the standby, or pretrack phase of operation, the radar antenna is held in alignment in azimuth in the direction of motion of the aircraft by information from the autonavigator.

This airborne radar is similar to that presently in use in automatic ground position indicators. Utilizing multiple antennas, transmitting forward and backward from the aircraft, a Doppler frequency shift occurs in the returning signal depending on the aircraft velocity. This is known as the Doppler effect, from which the radar gains its name.

During the track phase of operation, the radar itself, as presently constructed, rotates its antenna in azimuth until it is aligned with the ground track of the aircraft. Due to slaving of the antenna to the roll and pitch plane of the stable platform, the azimuth of the antenna is in a plane parallel to the azimuth plane of the stable platform which is called the roll and pitch plane, or the $x$—$y$ plane, and is, ordinarily, horizontal. The $x$ axis is the roll axis and is forward and hte $y$ axis is the pitch axis and is lateral. The azimuth of the antenna indicates the true direction of aircraft velocity. Velocity as determined by the radar is indicated by the speed of the shaft of a servo motor which is determined by the radar from the amount of Doppler shift.

In summary, the autonavigator computer determines the velocity of the aircraft from the information furnished by the distance meters. This information constitutes a correct velocity, plus the sinusoidal errors and random errors. Radar or one of the other means for determining velocity with respect to the earth, or a combination of such means, is used as a second source to determine the velocity and the information computed from the comparison of radar velocity and autonavigator velocity is fed to the distance meters which are corrected, accordingly, to remove, or damp, their errors. The radar information must first be resolved into components along each of the $x$ and $y$ axes of the inertial distance meters ($x$—$y$ plane) to give the correct values which each distance meter should be indicating. It is understood that one distance meter measures forward along one axis, $x$, and the other measures to the side along the other axis, $y$.

If the stable platform departs from local horizontal (as in the case of lateral deviation from the guidance plane), and the antenna is slaved to the platform in roll and pitch, some further error in the radar information would be introduced.

It is therefore an object of this invention to provide a system of correcting the errors in an autonavigator by comparison with velocity information measured by other means.

A further object of this invention is to provide a system of comparing ground velocity information with autonavigator information.

Another object of this invention is to provide a system for aligning a radar antenna in accordanec with the stable platform of an autonavigator.

A still further object of this invention is to provide a system for comparing radar velocity information with autonavigator information and correcting the autonavigator accordingly.

Other objects of invention will become apparent from the following description taken in connection with the accompanying drawings, in which FIG. 1 is a flow diagram of information of one form of the invention;

FIG. 2 is a schematic of another form of the invention incorporating the basic concept of FIG. 1;

Figure 1:
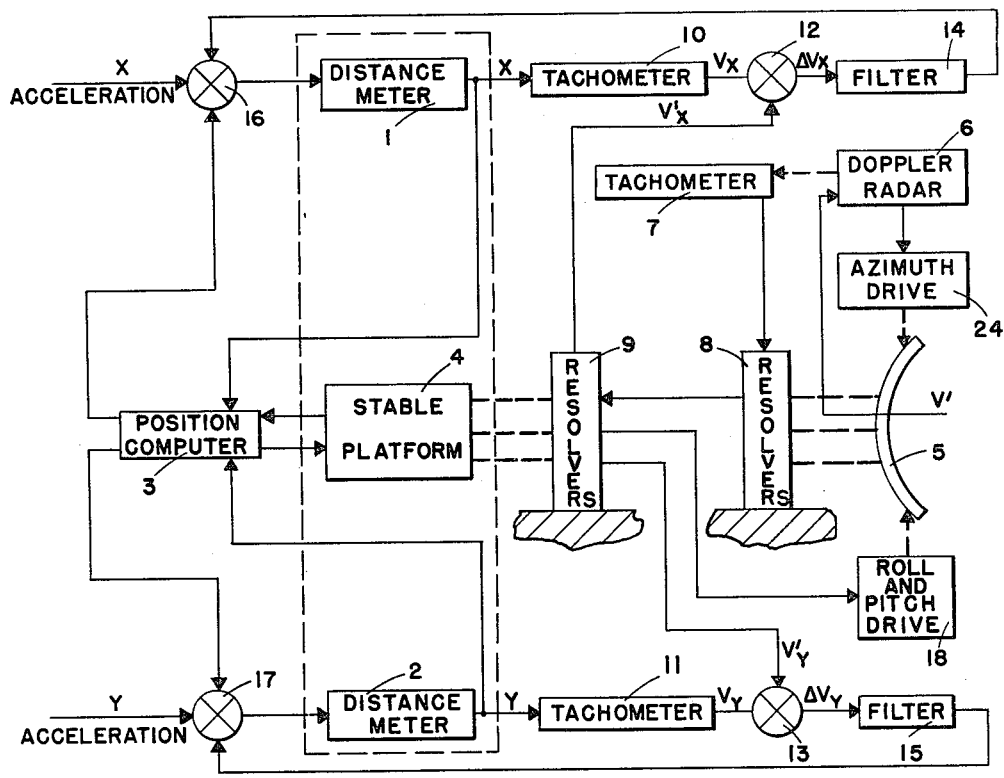

The device is illustrated in flow chart form in FIG. 1. Distance meters 1 and 2 indicate distances traveled along the respective sensitive axis of each and this information is transmitted to the position computer 3 and thence to stable platform 4. The information furnished by distance meters 1 and 2 is determined from the acceleration inputs and contains errors such as those due to errors in acceleration, initial position, and velocity and, thus, causes the phenomenon described in the second paragraph of column 1 hereof. Through antenna 5, a Doppler radar system 6 determines the ground velocity $V'$ and drives tachometer 7 at a speed which indicates velocity. Resolvers 8 and 9 transform ground velocity and azimuth of ground velocity from antenna coordinates into stable platform coordinates. Tachometers 10 and 11 change distance traveled information presented by the distance meters to velocity information. Junctions 12 and 13 determine the difference in the velocity information as derived from the distance meter information and that derived from the radar. Following junctions 12 and 13 are specially designed filter sections 14 and 15, respectively. The period of the error sinusoids is some eighty-four minutes in length. A simple RC filter section designed to have a time response of such length, would require impractical condenser and resistor size. By including the filter section between two high gain, high impedance amplifiers, and by incorporating considerable negative feedback, the time constant of the filter section (RC value) can be greatly increased. Such filtering eliminates the D.-C. error component of the radar. That is, utilizing such a filter, the radar need not be free from bias error in measuring the velocities. Therefore, the radar may produce velocity indications consistently five miles per hour too high, but such error is unimportant if the information is smoothed by the above-described filter section. This is also true of information being received frm tachometers 10 and 11. At junctions 16 and 17, the computed error in velocity along the $x$ and $y$ axes as determined from the radar is fed as a correcting signal input into the distance meters to make their outputs correct. Resolvers 9 receiving signals from resolvers 8 enslave the radar antenna 5 in pitch and roll by means of drive 18.

FIG. 2 indicates in more detail the structural components in the slaving mechanisms and the resolving mechanisms between radar elements and the stable platform. It is desirable for position computer 3, during the radar standby phase, to keep the radar antenna oriented in azimuth along the missile's velocity vector. It is also desirable that the radar velocity indicator be slaved to the computed velocity during standby. By slaving the radar in this manner, it is always held within close orientation and velocity indication in order to require a minimum transition from the standby phase to the track phase. This standby phase is not indicated in FIG. 1. To hold the radar oriented during standby, signals representing velocities along the $x$ and $y$ axes, determined by the computer from autonavigator information, are fed to amplifiers 19 and 20, FIG. 2, respectively, and then to resolver 21. Resolver 21 is mounted to determine azimuth of the antenna relative to the airframe and resolver 22 is mounted to determine azimuth of the stable platform relative to the airframe. Resolvers 21 and 22 cooperate to detect any difference in antenna azimuth and azimuth of the resultant velocity of the aircraft as indicated by the two components of velocity determined from the output of the distance meters which are located on the stable platform. If any occurs, resolver 22 sends a correcting signal to amplifier 23 and thence to servo motor 24 to correct and thus slave the antenna in azimuth. By such cooperation of resolvers, resolver 22 is also able to receive the velocity reading $V'$, indicated by the radar, compare it with the autonavigator velocity information and return a correcting amount to amplifier 25 so that during the standby phase the radar is also slaved to the autonavigator in velocity information. The equations for the sine and cosine resolution accomplished by resolvers 21 and 22 and inputs to amplifiers 23 and 25, respectively, during standby phase are $$-\Delta\Psi = (V_y \cos \Psi - V_x \sin \Psi) \cos \Psi + (V_x \cos \Psi + V_y \sin \Psi) \sin \Psi$$

a signal $\Delta\Psi$ will flow to amplifier 23 and cause the antenna to be driven in azimuth until the antenna azimuth is identical with the azimuth of the resultant velocity vector of the aircraft as determined by the autonavigator.

$$-\Delta v = (V_x \cos \Psi + V_y \sin \Psi) \cos \Psi - (V_y \cos \Psi - V_x \sin \Psi) \sin \Psi - V'$$

It can be shown that as $\Delta v \rightarrow 0$, then $V' \rightarrow \sqrt{(V_x^2 + V_y^2)}$, which means that a signal $\Delta v$ will flow to amplifier 25 and cause servomotor 34 to speed up until it indicates the same velocity as the autonavigator is indicating. Where $\Psi$ = azimuth of antenna.
$\psi$ = azimuth of stable platform.
$\Delta\Psi$ = amount antenna must be rotated in azimuth to coincide with the resultant velocity of the vehicle as determined from the distance meters or accelerometers on the stable platform.
$V'$ = velocity indicated by the radar.
$\Delta v$ = correction to velocity indicated by radar so that it is same as that indicated by autonavigator.
$V_x$ = velocity along $x$ axis determined by the autonavigator.
$V_y$ = velocity along $y$ axis determined by the autonavigator.

Resolvers 26 and 27 are mounted, respectively, on the roll and pitch axes of the antenna mounting; and the resolvers 28 and 29 are mounted, correspondingly, on the roll and pitch axes of the stable platform. The roll signals from the stable platform and the antenna mount are combined by the roll resolvers 26 and 28 and the error signal drives amplifier 30 and servo motor 31 to slave the roll of the antenna to that of the stable platform. Slaving of the antenna in pitch is similarly accomplished by combining the information of resolvers 27 and 29 and driving amplifier 32 according to their difference. Servo motor 33 drives the antenna in pitch until the antenna corresponds in pitch with the stable platform. Thus, by reason of servo motor 34, in standby phase, the antenna is slaved in azimuth to the resultant velocity vector as determined from the distance meters or accelerometers on the stable platform. As previously explained, in the standby phase, resolver 22 slaves the amplifier 25 and servo motor 34 to the velocity indicated by the autonavigator computer. Tachometer generator 7 is located in the return loop of this velocity slaving circuit. Until radar tracking is commenced, there is no correction made to the velocities being registered at the computer. Rather, the radar elements are held slaved to the speed and direction of the aircraft velocity as determined by the autonavigator.

As soon as radar tracking is commenced, the switches are thrown from "S" to "T." This is accomplished automatically by relays which trip all switches when the radar starts tracking. The antenna of the doppler radar, as presently developed, follows the ground track of the aircraft. The information of true azimuth and velocity of the aircraft relative to ground is transmitted through amplifier 19 to resolver 21 which, because it is mounted on the antenna azimuth gimbal, transforms the velocity signal into the airframe coordinates. The signal is then sent to resolver 22 which, being on the table platform of the autonavigator transforms the velocity information from airframe coordinates into the coordinates of the stable platform. A velocity signal as determined by the autonavigator along the $x$—$y$ axes is also fed to resolver 22 from the computer. Resolver 22 then produces a signal which is the difference in velocity as determined by the radar and as determined by the autonavigator. This difference is the error which needs to be removed from the distance meters. Resolver coil 22a provides the difference in velocity in the Y direction ($\Delta V_y$) and resolver coil 22b provides the difference in velocity in the X direction ($\Delta V_x$).

This error is sent to filters 36 and 37, and then sent to summing amplifiers 38 and 39 before finally being impressed upon the distance meters for correction and consequent damping of the sinusoidal oscillation induced by acceleration, position, or velocity errors.

The transfer characteristic of the filter which appropriately converts such signals is described in Laplace transform notation as $$\frac{s}{1+Ts}$$

where T is a period of a wave considerably longer in time than that desired to be passed without too great attenuation. In this case 16,000 seconds are used for T. S is the Laplace transform notation for a complex variable. The filter section only is shown in FIG. 3 in which an RC circuit appears between amplifiers 40 and 41 one of which is non-inverting.

The correcting signal obtained at the output of resolver 22 is of low signal level and is amplitude modulated. If a carrier frequency of, say, 400 cycles is used, the signal must be demodulated as well as filtered to go to the summing amplifiers and then to the inertial distance meters.

Figure 3:
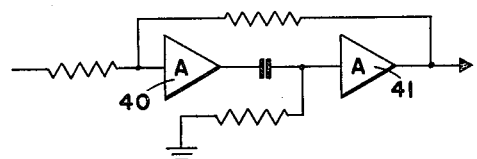
FIG. 3 is a schematic of the filter of FIGS. 1 and 2.
Figure 4:
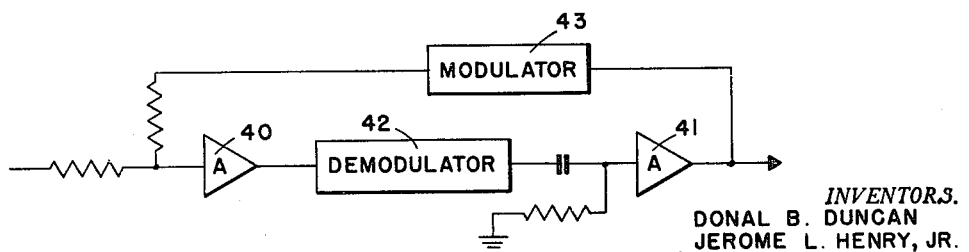
FIG. 4 is an alternate form of the filter of FIG. 3.

FIG. 4 denotes a filter demodulator which may be substituted for the filter of FIG. 3. A demodulator 42 is interposed between the two amplifiers 40 and 41 and, therefore, a modulator 43 must be included in the return loop.

Figure 5:
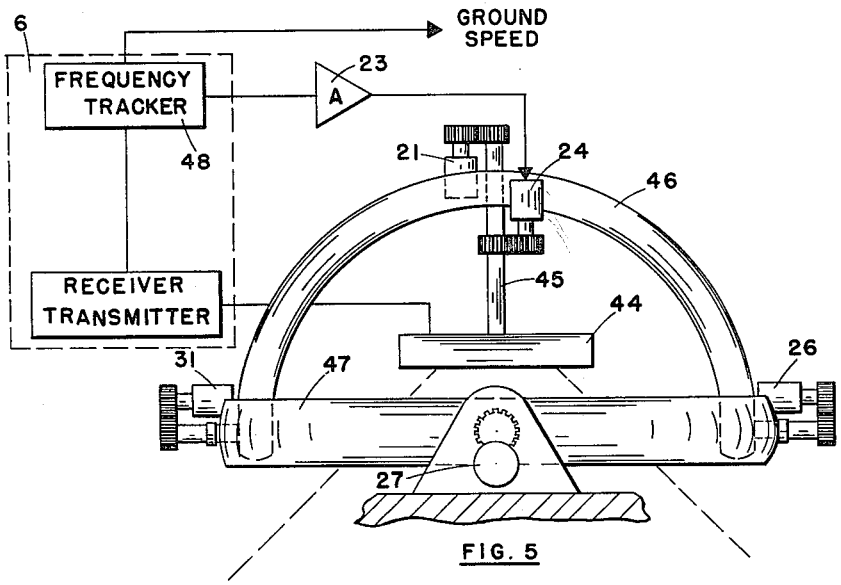
FIG. 5 is an example of antenna gimbal sequence and resolver mounting, and an elementary diagram of a Doppler radar system.

The gimbal sequence of the radar antenna should be the same as the gimbal sequence of the stable platform. FIG. 5 indicates the sequence to be, from outside in, pitch, roll, and then azimuth. The antenna array 44 scans downwardly in a forward and backward direction. It is directed in azimuth by shaft 45. Half gimbal 46 directs the antenna in roll. Azimuth resolver 21 can be seen to be mounted on roll gimbal 46. Roll resolver 26 is shown mounted on pitch gimbal 47 and pitch resolver 27 is mounted on the airframe. On the stable platform (not shown) the resolvers 22, 28, and 29 are mounted in corresponding fashion. In this comparison, the antenna array 44 would correspond to the stable element of the stable platform.

The radar system used in this device is illustrated in block form in FIG. 5. The principles of operation of this type radar are set forth in Electronic Time Measurements, Massachusetts Institute of Technology, Radiation Laboratory Series, vol. 20, page 16 et seq. Generally describing it, multiple antennas 44 in linear array transmit radar pulses forward and backward from the aircraft. The signals sent forward and backward to the left are compared in the frequency tracker 48 with the signals sent forward and backward to the right. The antenna is driven in azimuth until these returning signals indicate the same Doppler shift. Thus, the antenna becomes aligned with the ground track of the aircraft. The frequency tracker 48, in FIG. 5, also provides a signal proportional to Doppler shift. Since the amount of Doppler shift is directly dependent on aircraft velocity, the frequency tracker will indicate ground speed.

Figure 6:
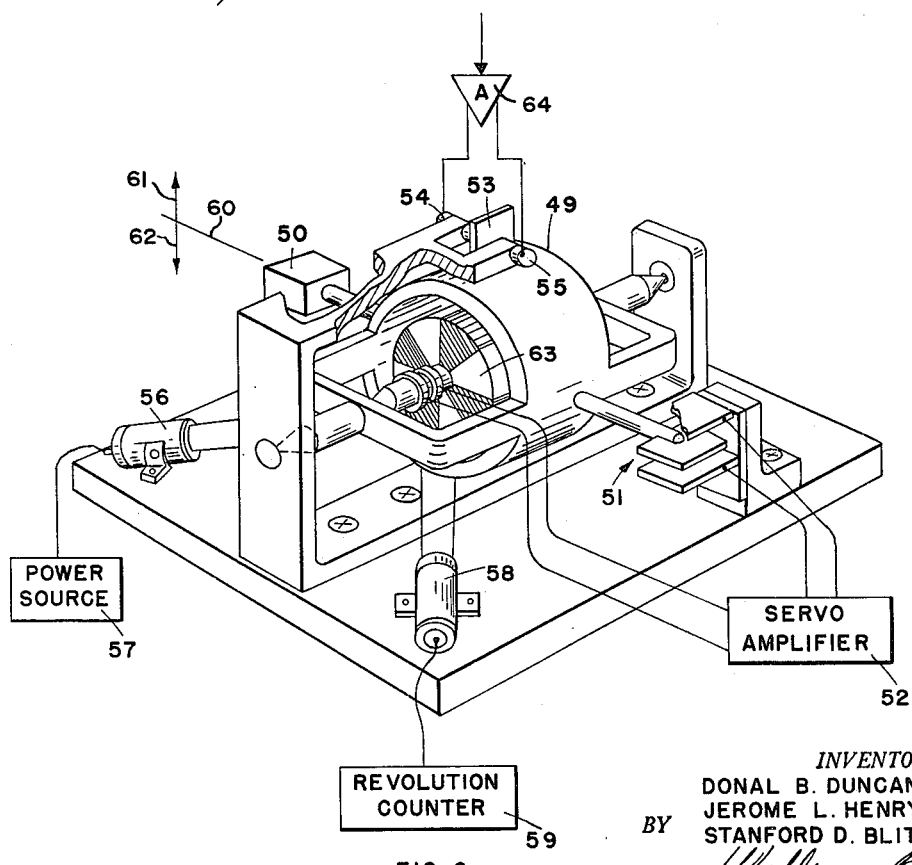
FIG. 6 is a schematic of a distance meter.

A distance meter which can be suitably adapted to receive correction by electrical input, FIG. 6, has been previously disclosed in Patent No. 2,882,034, issued April 14, 1959, for "Accelerometer and Integrator," in the name of John M. Wuerth and filed November 1, 1948.

In that disclosure is described structure which is shown in FIG. 6, wherein a rotor 63 within a frame stator 49 upon which is located an eccentric mass 50. Stator 49 is balanced above its pivotal axis except for mass eccentricity along axis 60 (such as mass eccentricity provided by mass 50). The stator is sensitive, therefore, only to accelerations in the directions of arrows 61 and 62. Therefore, the device shown would be turned on its side so that it would be sensitive in the x direction (for one distance meter) or the y direction (for the other distance meter). These directions, it may be appreciated, are established and held by the stable platform of an autonavigator and are, of course, in directions which are orthogonal to the acceleration of gravity. The distance meters, or accelerometers, therefore do not read the acceleration of gravity but rather the acceleration along the specific x or y axis. Under acceleration, the frame 49, which is pivotally mounted, rotates slightly. A pickoff 51 detecting any rotation of the frame provides a signal to a servo amplifier 52 which, in turn, speeds up the rotor 63. As the rotor increases in speed, greater torque is developed between the rotor and stator frame. In summary, the rotor is driven at a speed sufficient to balance the eccentric frame against acceleration. Consequently, the speed at which the rotor turns is proportional to velocity. The frequency of the signal provided by photoelectric cell 58, therefore, indicates the velocity experienced by the distance meter. In FIG. 1, tachometer 10 and 11 illustrate another method of determining the rotor speed of the distance meter. It may be appreciated that such systems are nothing more than integrating means, which provide the first integral of acceleration (velocity) experienced by the acceleration-sensitive portions of the distance meter.

The number of rotations is proportional to the distance traveled. Various methods of detecting the velocity of the rotor or of counting the number of rotations are possible. FIG. 6 also shows a magnetic vane 53 located on pivoted frame 49. Magnetic coils 54 and 55 drive vane 53 in one direction or another, acting as a torquer. In this way, frame 49 can be electrically torqued in the same manner it would be torqued by an acceleration acting on eccentric mass 50. Such construction provides a convenient means of applying electrical signals to a distance meter in order to correct it.

A light 56 energized by power source 57 reflects on alternate dark and light areas on the rotor. Photoelectric cell 58 receives the light reflections and provides an electrical output to the revolutions counter 59 in accordance with the revolutions of the rotor 63. As stated previously, the speed at which the rotor 63 rotates is proportional to velocity. A tachometer which measures this speed (providing an output electrical signal proportional to rate of rotation of shaft input) would indicate velocity of the autonavigator. Or, likewise, a tachometer which would indicate how fast Counter 59 is counting would also indicate velocity. Such tachometer is illustrated in FIG. 1.

Amplifier 64, in one embodiment of the invention, may thus be connected to receive the output of filter demodulator 36 or 37, whereby the output of the distance meter will be corrected, or damped. Consequently, the complete autonavigator is corrected because the inertia sensing (acceleration-sensing) devices are made more accurate by correction, or damping thereof.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an autonavigator comprising a platform element stabilized in a prescribed orientation in pitch, roll, and azimuth, acceleration-sensitive means disposed upon said element; means responsive to said acceleration-sensitive means to compute velocities in the prescribed orientation of said stabilized element, non-inertial means for determining autonavigator velocity with respect to the ground in the pitch and roll plane of said acceleration-sensitive means, means for comparing the velocity and direction as determined by said non-inertial with that determined by the autonavigator, and means for correcting the direction and velocity as determined by the autonavigator according to the output of said comparison means.

2. In an autonavigator comprising a platform element oriented in a prescribed fashion in pitch, roll, and azimuth, a pair of acceleration sensitive devices disposed upon said element, said devices disposed to sense accelerations at right angles to each other, means responsive to said acceleration-sensitive devices to compute velocities in the prescribed orientation of said stabilized element, correcting means for said autonavigator comprising means for determining velocity and direction with respect to ground in the pitch and roll plane of said acceleration-sensitive devices, and means for resolving the determined velocity into components of magnitude in the direction of said acceleration-sensitive devices, and means for comparing the velocity as provided by said autonavigator with that provided by said resolving means and means for correcting said acceleration-sensitive devices in accordance with said comparison of velocity.

3. In an autonavigator comprising means for measuring accelerations in orthogonal directions, a stabilized platform providing mounting for said acceleration measuring means, said platform oriented in a prescribed direction in pitch, roll, and azimuth, means responsive to said acceleration measuring means so as to provide signals indicating velocities, correcting means for said autonavigator comprising non-inertial means for determining vehicular velocity and direction with respect to ground in the pitch and roll plane of said acceleration measuring means, means for resolving the non-inertially determined velocity and direction into components lying in the orthogonal directions of said acceleration measuring means and means for correcting said acceleration measuring means in accordance with the difference between velocity as provided by the output of said resolving means and the velocity as determined according to said acceleration measuring means.

4. In an autonavigator comprising acceleration-sensitive means having sensitive axes in orthogonal directions, integrating means providing signals indicating velocity of said autonavigator in orthogonal directions, said integrating means having a connection to receive the output of said acceleration-sensitive means, the combination of means independent of said acceleration-sensitive means for providing signals indicating velocity, means for resolving said latter-mentioned signals of velocity into signals representing orthogonal vector components of velocity in the directions of said sensitive axes of said acceleration-sensitive means, and means for comparing said signals representing orthogonal components of velocity and means for correcting the output of said autonavigator in accordance with the difference between said signals indicating velocity.

5. In combination acceleration-sensitive means and means sensitive to angular motion providing reference orientation for said acceleration-sensitive means, integrating means providing signals representing velocity of said acceleration-sensitive means, said integrating means connected to receive the output of said acceleration-sensitive means, means independent of said acceleration-sensitive means for determining velocity, and means for resolving said velocity into components in the reference orientation established for said acceleration-sensitive means, means for comparing velocity as determined by said acceleration-sensitive means and said resolved velocity from said resolving means, means for correcting the output of said acceleration-sensitive means in accordance with said comparison.

6. In an autonavigator comprising acceleration-sensitive means, gyroscopic means sensitive to angular motion, and means determining velocity of said autonavigator in accordance with the output of said acceleration-sensitive means according to the reference provided by said gyroscopic means, the combination of non-inertial means for determining velocity component vectors with respect to the reference provided by said gyroscope means, and means for correcting the output of said means for determining velocity, said correction being in accordance with the difference in velocity as measured by said non-inertial means and as determined by said means for determining velocity in accordance with the output of said acceleration-sensitive means.

7. In an autonavigator comprising acceleration-sensitive means having directions of sensitivity, means determining velocity of said autonavigator in accordance with the output of said acceleration-sensitive means, the combination on non-inertial means for determining velocity components of said autonavigator along the direction of sensitivity of said acceleration-sensitive means, and means for damping the output of said autonavigator in accordance with the difference between said signals representing velocity received from said non-inertial means for determining velocity and signals representing velocity as determined by said autonavigator.

8. In an autonavigator comprising inertial means sensitive to acceleration, means for determining the velocity of said autonavigator from the output of said inertial means, said autonavigator velocity being determined in prescribed coordinates, radar means for providing signals indicating autonavigator velocity with respect to the ground, means for transforming the radar velocity signals into the coordinates of said autonavigator velocity signals, and means for correcting the velocity signals of said autonavigator means, said correction being in accordance with the difference in velocity as determined from said radar and said autonavigator.

9. In an autonavigator including velocity determining means mounted upon a platform stabilized in prescribed orientation in pitch, roll, and azimuth, means for correcting the error in said autonavigator comprising radar means for determining vehicle velocity and direction relative to the ground, means slaving the antenna of said radar in pitch and roll to the pitch and roll of said platform, means for resolving the radar determined vehicle velocity into components in the sensitive directions of said velocity determining means and means for correcting said velocity determining means in accordance with the output of said resolving means.

10. In an autonavigator including acceleration-sensitive means mounted upon a platform stabilized in prescribed orientation in pitch, roll, and azimuth, integrating means responsive to said acceleration-sensitive means so as to provide electrical signals indicating velocity, means for determining the error in velocity as computed by said autonavigator comprising radar means providing signals indicating velocity and direction relative to the ground, means slaving the antenna of said radar in pitch and roll to the pitch and roll of said platform, means for determining the azimuth of said radar antenna with respect to said platform and means for resolving the radar velocity signals into components in the sensitive direction of said acceleration-sensitive means.

11. In an autonavigator comprising a platform element stabilized in a prescribed orientation, acceleration-sensitive means disposed upon said element, means responsive to said acceleration-sensitive means, to compute and provide a signal indicating velocity, radar means providing signals indicating velocity and direction of motion with respect to the ground, resolving means for transforming the velocity signals provided by said radar and said autonavigator into orthogonal vector components in a common coordinate system, means for comparing said resolved radar velocity vector component signals and said autonavigator velocity vector component signals, and means for correcting the signals received from said autonavigator in accordance with said velocity comparison means.

12. In an autonavigator comprising a platform element stabilized in a prescribed orientation, acceleration-sensitive means disposed upon said element, means responsive to said acceleration-sensitive means to compute velocity in the prescribed orientation of said stabilized element, radar means providing signals indicating velocity and direction of motion with respect to the ground, resolving means for transforming said radar signals into the coordinates of said stabilized element, means for comparing the signals representing velocity provided by said radar and the signals representing velocity provided by said autonavigator, means for filtering the output of said comparison means, and means for correcting the output of said acceleration-sensitive means in acordance with the output of said filtering means.

13. In an autonavigator means for measuring accelerations, a stabilized platform element mounting said acceleration measuring means in prescribed orientation in pitch, roll and azimuth, means responsive to said acceleration measuring means so as to provide a signal indicating velocity, radar means providing signals representing velocity and direction relative to the ground, means slaving the antenna of said radar to the pitch and roll of said platform element, means for resolving the signals representing velocity as determined by said radar into components along the sensitive axes of said acceleration measuring means, means responsive to the difference in velocity signals provided from said means responsive to said acceleration measuring means and said radar, to damp the velocity signal produced from accelerations measured by said acceleration measuring means.

14. In a vehicular autonavigator including means for indicating velocity mounted upon a platform stabilized in prescribed orientation in pitch, roll, and yaw, correcting means for said autonavigator comprising radar means providing signals indicating vehicle velocity and direction relative to the ground, means slaving the antenna of said radar in pitch and roll to the pitch and roll of said platform, resolving means determining the azimuth angle between said antenna and said vehicle for transforming the radar velocity signals into components in the azimuth of the vehicle, resolving means determining the azimuth angle between said vehicle and said platform for transforming the radar velocity signals in the azimuth of the vehicle into components in the azimuth of the platform, means connecting the output of said latter resolving means to correct said means indicating velocity.

15. Error determining means for an autonavigator wherein is included means for measuring acceleration in prescribed directions and means for producing signals according to velocity from said acceleration measuring means, and radar means for determining direction of travel and producing signals according to velocity relative to ground, the combination of means for slaving the antenna of said radar in roll and pitch to the roll and pitch of said acceleration measuring means, means for transforming the velocity signals produced from said acceleration measuring means and the velocity signals from said radar means into a common azimuth, means for comparing said velocity signals whereby a signal output is obtained according to the velocity error in said means for producing signals according to velocity from said acceleration measuring means.

16. Error determining means for a vehicular autonavigator wherein is included acceleration sensitive means disposed upon a platform held in prescribed orientation in pitch, roll, and yaw, means for determining velocity from said acceleration sensitive means, and radar means determining direction of travel and producing signals according to velocity with respect to ground, the combination of means slaving the antenna of said radar in roll and pitch to said platform, an antenna azimuth resolver mounted to determine the azimuth angle between said vehicle and the antenna of said radar and connected to transform the signals according to velocity produced by the radar, a platform azimuth resolver mounted to determine the azimuth angle between said platform and said vehicle and connected to compare the output from the velocity determining means of the acceleration-sensitive means with the transformed radar velocity signals from said antenna azimuth resolver, providing a signal indicating velocity error.

17. Error determining means for autonavigator comprising a platform element stabilized in prescribed orientation in pitch, roll and azimuth, velocity measuring means disposed on said platform element so as to determine velocities in orthogonal directions, radar means providing signals representing velocity and direction relative to the ground, resolver means mounted to determine the pitch, roll and azimuth angles of said stabilized platform element, resolver means mounted to determine pitch, roll and azimuth angles of the antenna of said radar, servo means driving said antenna in pitch until the angles of said pitch resolvers are equal, servo means driving said antenna in roll until the angles of said roll resolvers are equal, means connecting the signals from said radar representing velocity to said antenna azimuth resolver, means connecting the output of said antenna azimuth resolver to said platform azimuth resolver, means connecting signals representing velocity as determined by said autonavigator to said platform azimuth resolver, filter means having a long time response, said filter means connected to receive the output of said resolver whereby signals are produced indicating the error in velocity as indicated by said autonavigator with reference to velocity indicated by said radar.

18. Correcting means for a vehicular autonavigator wherein velocity-indicating means are disposed upon a platform stabilized in prescribed orientation in pitch, roll, and azimuth, radar means for determining vehicle velocity and direction relative to the ground, resolvers mounted to determine the pitch, roll, and azimuth angles between said vehicle and said platform, pitch, roll, and azimuth resolvers mounted to determine the pitch, roll, and azimuth angles between said vehicle and the antenna of said radar, servo means driving said antenna in pitch until the angles of said pitch resolvers are equal, servo means driving said antenna in roll until the angles of said roll resolvers are equal, means connecting the output velocity signals of the radar to said antenna azimuth resolver, means connecting the output of said antenna azimuth resolver to said platform azimuth resolver, means connecting the velocity signal outputs of said autonavigator to said platform azimuth resolver, and means for correcting said velocity-indicating means in accordance with the output of said platform azimuth resolver.

References Cited in the file of this patent
UNITED STATES PATENTS

| | | |
|---|---|---|
| 2,426,228 | Mackta | Aug. 26, 1947 |
| 2,548,278 | Wirkler | Apr. 10, 1951 |
| 2,577,061 | Woolson et al. | Dec. 4, 1951 |
| 2,591,697 | Hays | Apr. 8, 1952 |
| 2,613,071 | Hansell | Oct. 7, 1952 |
| 2,652,979 | Chance | Sept. 22, 1953 |
| 2,676,770 | Schuck | Apr. 27, 1954 |
| 2,744,683 | Gray | May 8, 1956 |
| 2,762,123 | Schultz et al. | Sept. 11, 1956 |
| 2,914,763 | Greenwood et al. | Nov. 24, 1959 |